United States Patent
Geist et al.

(10) Patent No.: US 12,522,261 B2
(45) Date of Patent: Jan. 13, 2026

(54) MECHANICAL COUPLING IN AUTOMATED GLADHAND SYSTEM

(71) Applicant: Trackmobile LLC, LaGrange, GA (US)

(72) Inventors: James Geist, Inverness, IL (US); Phuc Nguyen, Papillion, NE (US); Jason Smid, Chicago, IL (US); Vince Difatta, Wood Dale, IL (US); Bob Evans, LaGrange, GA (US)

(73) Assignee: Trackmobile LLC, LaGrange, GA (US)

( * ) Notice: Subject to any disclaimer, the term of this patent is extended or adjusted under 35 U.S.C. 154(b) by 537 days.

(21) Appl. No.: 18/165,520

(22) Filed: Feb. 7, 2023

(65) Prior Publication Data

US 2023/0249719 A1  Aug. 10, 2023

Related U.S. Application Data

(60) Provisional application No. 63/307,599, filed on Feb. 7, 2022.

(51) Int. Cl.
*B61G 5/02* (2006.01)
*B61G 1/00* (2006.01)
(Continued)

(52) U.S. Cl.
CPC .................. *B61G 5/02* (2013.01); *B61G 1/00* (2013.01); *B61G 1/40* (2013.01); *B61G 1/42* (2013.01);
(Continued)

(58) Field of Classification Search
CPC ... B61G 5/02; B61G 5/06; B61G 5/08; B61G 7/06; B61G 7/08; B61G 7/10; B61G 7/12;
(Continued)

(56) References Cited

U.S. PATENT DOCUMENTS 1,797,630 A * 3/1931 Young ...................... B61G 5/08
285/70
3,388,928 A * 6/1968 Poker ...................... B61G 7/08
280/468

(Continued)

OTHER PUBLICATIONS

International Search Report dated May 31, 2023 issued in Int'l Appln. No. PCT/US2023/062121.

*Primary Examiner* — S. Joseph Morano
*Assistant Examiner* — James William Jones
(74) *Attorney, Agent, or Firm* — Arnold & Porter Kaye Scholer LLP

(57) ABSTRACT

A claw system for mechanical coupling a railcar mover to a railcar is disclosed herein. The claw assembly may comprise a set of arms and a set of claws each mounted on the interior side of one of the set of arms. When a railcar adjacent to a railcar mover on a set of tracks is positioned within a proximity of the railcar mover, the claw assembly may be utilized to grasp the air hose of the adjacent railcar. For example, the set of arms may be attached to the railcar mover via a motorized rail upon which the set of arms may be configured to move axially toward each other in a direction perpendicular to the tracks, thereby causing the claws to move toward each other and close around the air hose of the adjacent railcar. The claws may include openings configured to grasp the air hose.

16 Claims, 4 Drawing Sheets

(51) Int. Cl.
*B61G 1/40* (2006.01)
*B61G 1/42* (2006.01)
*B61G 5/08* (2006.01)
*B61G 7/06* (2006.01)
*B61G 7/10* (2006.01)
*B61G 7/12* (2006.01)
*B61J 3/00* (2006.01)
*B61J 3/08* (2006.01)
*B61J 3/10* (2006.01)
*B61J 3/12* (2006.01)

(52) U.S. Cl.
CPC ............... *B61G 5/08* (2013.01); *B61G 7/06* (2013.01); *B61G 7/10* (2013.01); *B61G 7/12* (2013.01); *B61J 3/00* (2013.01); *B61J 3/08* (2013.01); *B61J 3/10* (2013.01); *B61J 3/12* (2013.01)

(58) Field of Classification Search
CPC ..... B61G 1/00; B61G 1/40; B61G 1/42; B61J 3/12; B61J 3/00; B61J 3/08; B61J 3/10

USPC .............. 213/75 R, 76, 103, 106; 105/31, 32
See application file for complete search history.

(56) References Cited

U.S. PATENT DOCUMENTS

| | | | | |
|---|---|---|---|---|
| 3,731,953 | A * | 5/1973 | Temple | B61G 5/08 285/12 |
| 3,922,007 | A * | 11/1975 | Friedebach | B61J 3/12 280/456.1 |
| 3,941,254 | A * | 3/1976 | Sweger | B61G 5/08 285/69 |
| 4,015,720 | A * | 4/1977 | Peche | F16L 29/00 213/1.3 |
| 4,086,856 | A * | 5/1978 | Chenoweth | B60F 1/043 105/72.2 |
| 2013/0118374 | A1* | 5/2013 | Meister | B61J 3/12 105/73 |
| 2016/0313739 | A1 | 10/2016 | Mian | |
| 2018/0001476 | A1* | 1/2018 | Tan | B61G 7/04 |
| 2022/0017124 | A1* | 1/2022 | Fullerton | B61J 3/12 |

* cited by examiner

MECHANICAL COUPLING IN AUTOMATED GLADHAND SYSTEM

RELATED APPLICATIONS

This application claims priority to U.S. Provisional Patent Application No. 63/307,599, filed Feb. 7, 2022, the content of which is incorporated herein by reference in its entirety.

FIELD OF THE INVENTION

The present invention relates to the railway industry and, more particularly, to systems for coupling a railcar to another railcar or railway vehicle.

BACKGROUND OF THE DISCLOSURE

Railcar movers provide a more efficient way to move rail cars around within a rail yard than using a locomotive for such tasks. A railcar mover is a machine capable of traveling on both roads and rail tracks to efficiently move rail cars. The ability to move on roads allows the railcar mover to maneuver within or around a rail yard without a need for clear track to transport rail cars. In order to perform its desired function, a railcar mover must frequently couple to and uncouple from rail cars to move the rail cars around a train yard or controlled facility. However, conventional techniques for coupling a railcar mover to a rail car suffer from numerous drawbacks.

The coupling process typically requires two steps: mechanical coupling and air hose coupling. Mechanical coupling allows the railcar mover to physically move the rail car or set of rail cars, while air hose coupling allows the railcar mover to control the brakes of the rail car or set of rail cars. Using conventional techniques, mechanical coupling can be accomplished from a remote location with air hose coupling performed manually by a railcar mover operator. This requires the operator to work between the rail car and the railcar mover, exposing the equipment and operator to the potential for dangers that arise from human error. Alternatively, air hose coupling may be foregone altogether when coupling a railcar mover and rail car. When this is done, the brakes of the railcar mover alone are relied on to stop a coupled car assembly. This creates further potential problems, as the brakes of the railcar mover alone may be insufficient.

As such, there is a need for a better way to couple a railcar mover to a rail car that eliminates the need for an operator to manually couple a railcar mover to the air hose of the rail car.

SUMMARY OF THE INVENTION

Aspects of this disclosure relate to various embodiments of an assembly for mechanically coupling a railcar to another railcar or a railway vehicle. In various embodiments, a claw assembly is described comprising a set of arms and a set of claws mounted on the set of arms. For example, the set of arms may include at least a first arm and a second arm attached to an end of the railcar mover, and the set of claws may include at least a first claw mounted on an interior side of the first arm and a second claw mounted on an interior side of the second arm. When a railcar adjacent to a railcar mover on a set of tracks is positioned within a proximity of the railcar mover, the claw assembly may be utilized to grasp the air hose of the adjacent railcar. For example, the set of arms may be attached to the railcar mover via a motorized rail upon which the set of arms may be configured to move axially toward each other in a direction perpendicular to the tracks, thereby causing the claws to move toward each other and close around the air hose of the adjacent railcar. In some embodiments, the set of arms may each include a motorized rail positioned horizontally on the interior side of the arm to which at least one of the claws is affixed. In such embodiments, each claw may be configured to move axially along one of the set of arms toward the end of the railcar mover, thereby causing the air hose to be positioned closer to the railcar mover.

These and other objects, features, and characteristics of the invention disclosed herein will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention is illustrated by way of example and not limited in the accompanying figures in which like reference numerals indicate similar elements and in which.

These drawings are provided for purposes of illustration only and merely depict typical or example embodiments. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF THE INVENTION

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized, and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

Railcar movers are machines capable of operation in road mode and rail mode. In road mode, the railcar mover utilizes a set of road wheels to drive freely. In rail mode, the railcar mover utilizes a set of rail wheels that engage the rail of a train track to move along the track. When the railcar mover arrives at a rail car or set of rail cars it will move, the railcar mover must couple to the rail car or set of rail cars. Coupling of the railcar mover to a rail car or set of rail cars comprises mechanical coupling and air hose coupling. The invention described herein relates to a claw system that improves the function, efficiency, and safety of a railcar mover by locating a rail car air hose during the rail car coupling process and grabs ahold of the rail car air hose in a way that allows for further manipulation.

Figure 1:
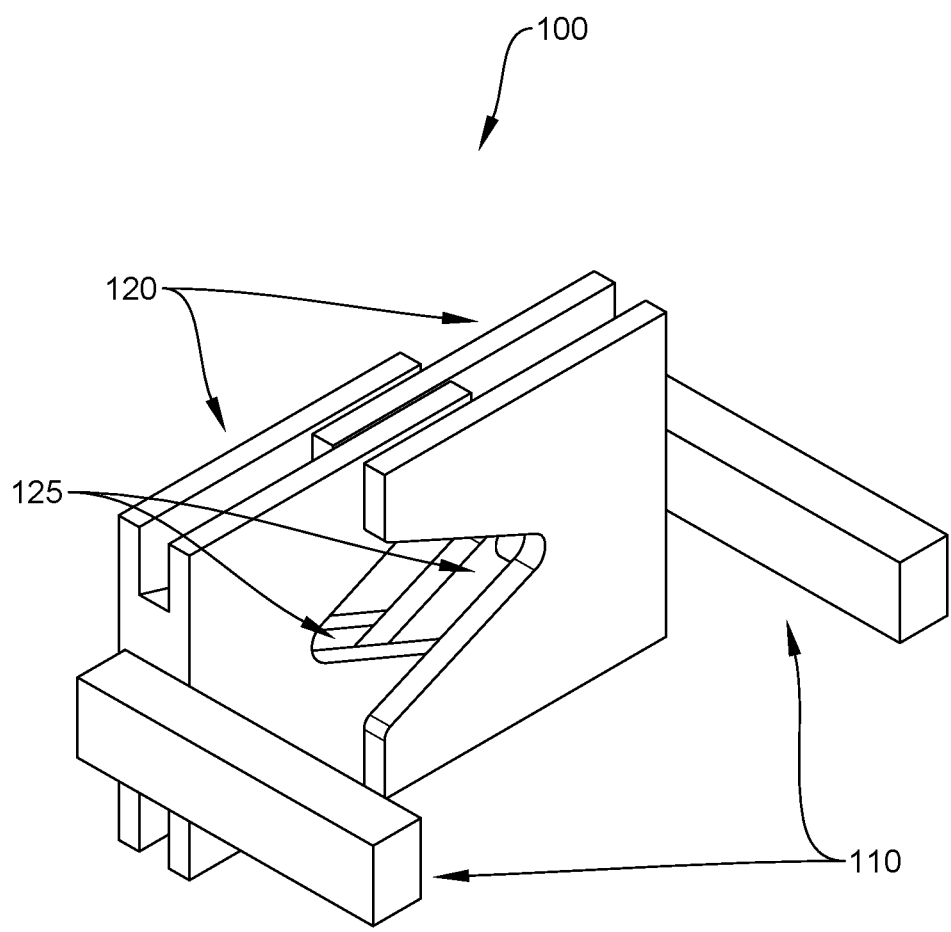
FIG. 1 depicts a perspective view of an example claw system, according to one or more aspects described herein.

For example, FIG. 1 depicts a perspective view of a claw system 100, according to one or more aspects described herein. Claw system 100 may be configured to facilitate air hose coupling and decoupling. In various embodiments, claw system 100 may include a set of arms 110, a set of claws 120, and/or one or more other components. In some embodiments, the set of claws 120 may be mounted to the set of arms 110 towards the end of the set of arms 110. In an example embodiment, the set of arms 110 may comprise two arms, the set of claws 120 may comprise two claws, and a single claw of the set of two claws 120 may be affixed to each of the two arms 110. In various embodiments, the set of claws 120 may include openings 125 on interior sides of the claws 120 opposite the arms 110. In various embodiments, the openings 125 may form male and female connectors that enable the set of claws 120 to overlap and grasp an air hose of a rail car. In various embodiments, the openings 125 of the set of claws 120 may be offset to enable the claws 120 to receive each other and grasp an air hose of a rail car. In some embodiments, the opening 125 of a first claw may be offset with respect to the opening 125 of a second claw such that the first claw and the second claw overlap when the arms move toward each other. In some embodiments, the position of a first claw on a first rail may be offset with respect to the position of a second claw on a second rail such that the first claw and the second claw overlap when the arms move toward each other. In some embodiments, set of claws 120 may comprise interleaving claws. For example, the use of interleaving claws may allow for increased redirection and/or bending control authority over the hose, which may be required to facilitate successful mating of the air hose with a railcar mover or other railway vehicle. In this manner, set of claws 120 may comprise full claws as shown or partial claws depending on the directional authority required.

Figure 2:
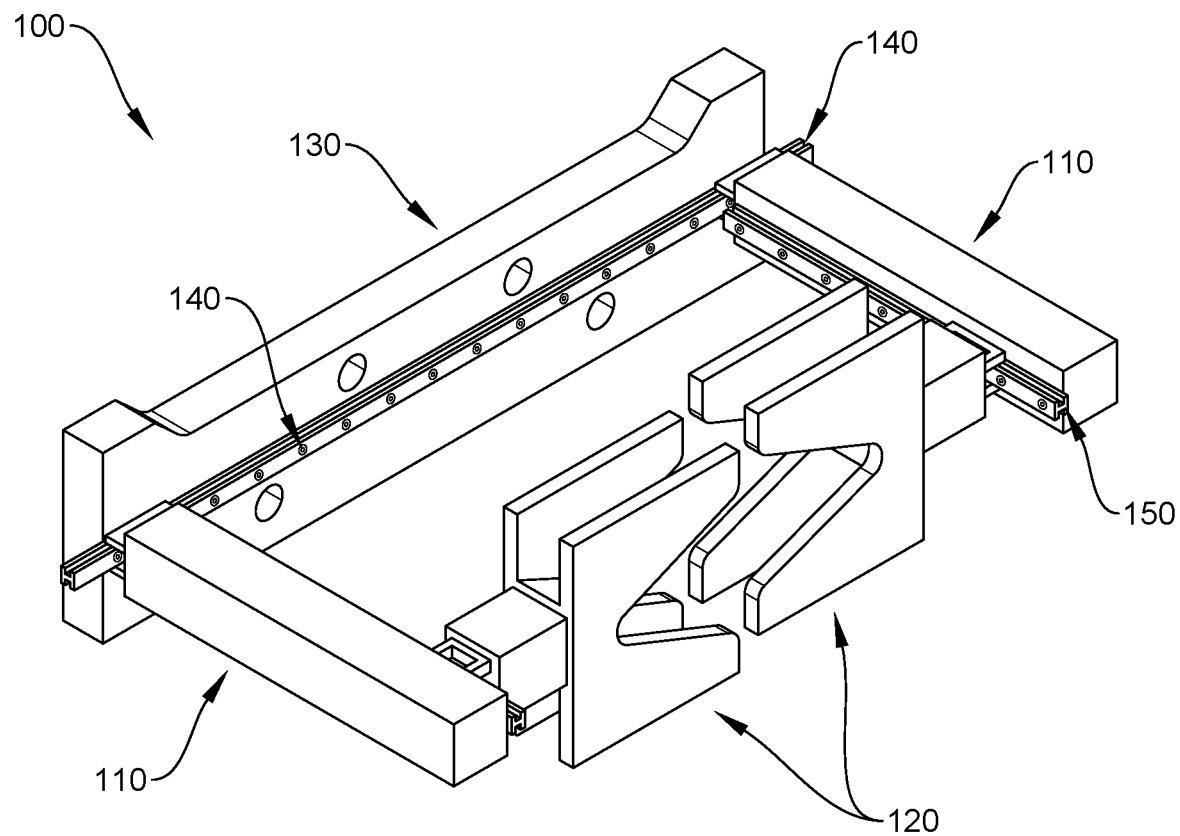
FIG. 2 depicts a perspective view of an example claw system attached to a bumper of a railcar mover, according to one or more aspects described herein.

FIG. 2 depicts a perspective view of claw system 100 in which the set of arms 110 are attached to a bumper 130 of a railcar mover. In various embodiments, bumper 130 of the railcar mover may include a rail 140 on which arms 110 may be configured to move axially along a side of bumper 130 to which the set of arms 110 are affixed. For example, when coupling with a rail car, the set of arms 110 may slide along rail 140 towards one another to cause the set of claws 120 to grasp an air hose of a rail car. Meanwhile, when decoupling from a rail car, the set of arms 110 may slide along rail 140 away from one another to cause the set of claws 120 to release an air hose of the rail car. In various embodiments, the set of arms 110 may each include a rail 150 on which an individual claw of the set of claws 120 may be configured to move axially along a side of the arms 110 on which the claw is affixed. For example, when coupling or decoupling with a rail car, the set of claws 120 may slide along rail 150 towards or away from the bumper 130 of the railcar mover to bring an air hose of a rail car into a selected position relative to the railcar mover. In some embodiments, rail 140 and/or rail 150 may comprise a motorized rail. In some embodiments, rail 140 and/or rail 150 may be configured to enable the set of arms 110 and/or the set of claws 120, respectively, to operate in unison. In some embodiments, rail 140 and/or rail 150 may be powered via one or more means. For example, the set of arms 110 and/or the set of claws 120 may be configured to move on rail 140 and/or rail 150 via power from a motor, from a pneumatic system, and/or from one or more other means.

In various embodiments, movement of arms 110 on rail 140 and/or movement of claws 120 on rail 150 may be controlled remotely, enabling claw system 100 to operate in a remote manner. In some embodiments, movement of arms 110 on rail 140 and/or movement of claws 120 on rail 150 may be controlled automatically, enabling claw system 100 to couple and/or decouple a railcar from a railcar mover or other railway vehicle without a worker present or directly controlling the process. For example, in some embodiments, one or more sensors may be positioned on an end of a railway vehicle to which claw system 100 is attached that are configured to detect when a railcar or other railway vehicle is within a pre-defined proximity and cause the set of arms 110 and their respective set of claws 120 to close around the air hose of the railcar or other railway vehicle. In some embodiments, the one or more sensors may comprise proximity sensors and/or one or more other types of sensors. For example, the one or more sensors may include capacitive proximity sensors, inductive proximity sensors, magnetic proximity sensors, optical proximity sensors, ultrasonic proximity sensors, and/or other types of sensors configured to determine when a railcar or other railway vehicle is within a pre-defined proximity. In some embodiments, one or more sensors may be positioned on claws 120 that are configured to detect when the claws 120 have closed around an air hose of a railcar or other railway vehicle. For example, a Hall effect sensor and/or other proximity sensor may be affixed to one or more of claws 120 and configured to detect when the claws 120 have sufficiently closed around (or grasped) an air hose and stop movement of the set of arms 110.

In various embodiments, claw system 100 may be controlled by a processor located within, proximate to, or remote from claw system 100 that is configured to cause the set of arms 110 and their respective set of claws 120 to close around the air hose of a railcar or other railway vehicle in response to user input and/or automatically based on input received from one or more sensors positioned on an end of a railway vehicle to which claw system 100 is attached and/or on a component of claw system 100 itself (e.g., such as sensors positioned on claws 120). For example, based on detection of a railcar or other railway vehicle within a pre-defined proximity of claw system 100 or a railway vehicle to which claw system 100 is attached, an action by claw system 100 may be initiated to grasp an air hose of the railcar or other railway vehicle. In another example, based on detection that claws 120 have sufficiently closed around an air hose of a railcar or other railway vehicle, an action by claw system 100 (e.g., movement of the set of arms 110) may be ceased to prevent further closing of the claws 120 around the air hose.

Figure 3:
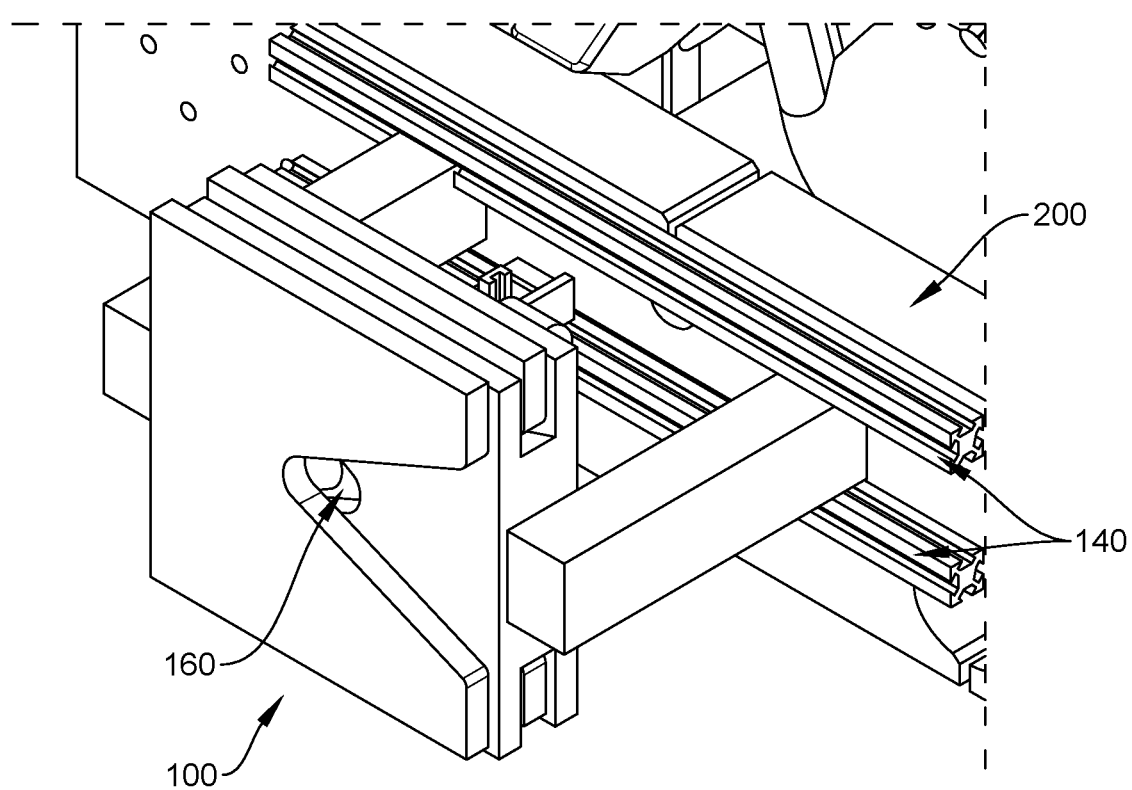
FIG. 3 depicts a perspective view of an example claw system attached to a railcar mover in a closed position, according to one or more aspects described herein.

FIG. 3 depicts a perspective view of claw system 100 described herein in a closed position and attached to a railcar mover 200. In various embodiments, arms 110 of claw system 100 may be attached to a railcar mover 200 via a single rail 140 or multiple rails 140, as depicted in FIG. 3. In various embodiments, a slot 160 is formed between a closed set of claws 120 through which an air hose of a rail car may be grasped and positioned for coupling with the railcar mover 200.

As described, when performing air hose coupling of a railcar mover to a rail car or set of rail cars, claw system 100 may be used to locate and grasp a rail car air hose for coupling with a railcar mover. In an example implementation, the set of claws 120 may start apart from each other and be brought together around a rail car air hose with the openings 125 of the set of claws 120 aligned. The alignment and size of the set of claws 120 allows the claw system 100 to close together around the rail car air brake hose, slide along the air brake hose bringing it towards the railcar mover, and align the air brake hose for coupling with the railcar mover. To couple air brake hose of a rail car with the railcar mover, a separate coupler may be extended to mate the air brake hose with the rail car air hose. Once mated, the railcar mover may control the brakes of the rail car or set of rail cars as well as the brakes of the railcar mover itself. In some implementations, the claw system 100 may allow the set of claws 120 to position the air brake hose further from the railcar mover. For example, the set of claws may move the air brake hose away from the railcar mover and/or keep the air brake hose at a constant distance from the railcar mover.

Once a rail car or set of rail cars have been moved to a desired location, the railcar mover may be decoupled from the rail car or set of rail cars. For example, to decouple the railcar mover from the rail car or set of rail cars, the air brake hose and the rail car hose may be unmated and the claw system 100 described herein may be used to position the air hose of the rail car away from the railcar mover. The set of arms 110 of claw system 100 may then separate to release the air brake hose from the set of claws 120 such that the air brake hose is no longer secured by claw system 100.

Figure 4:
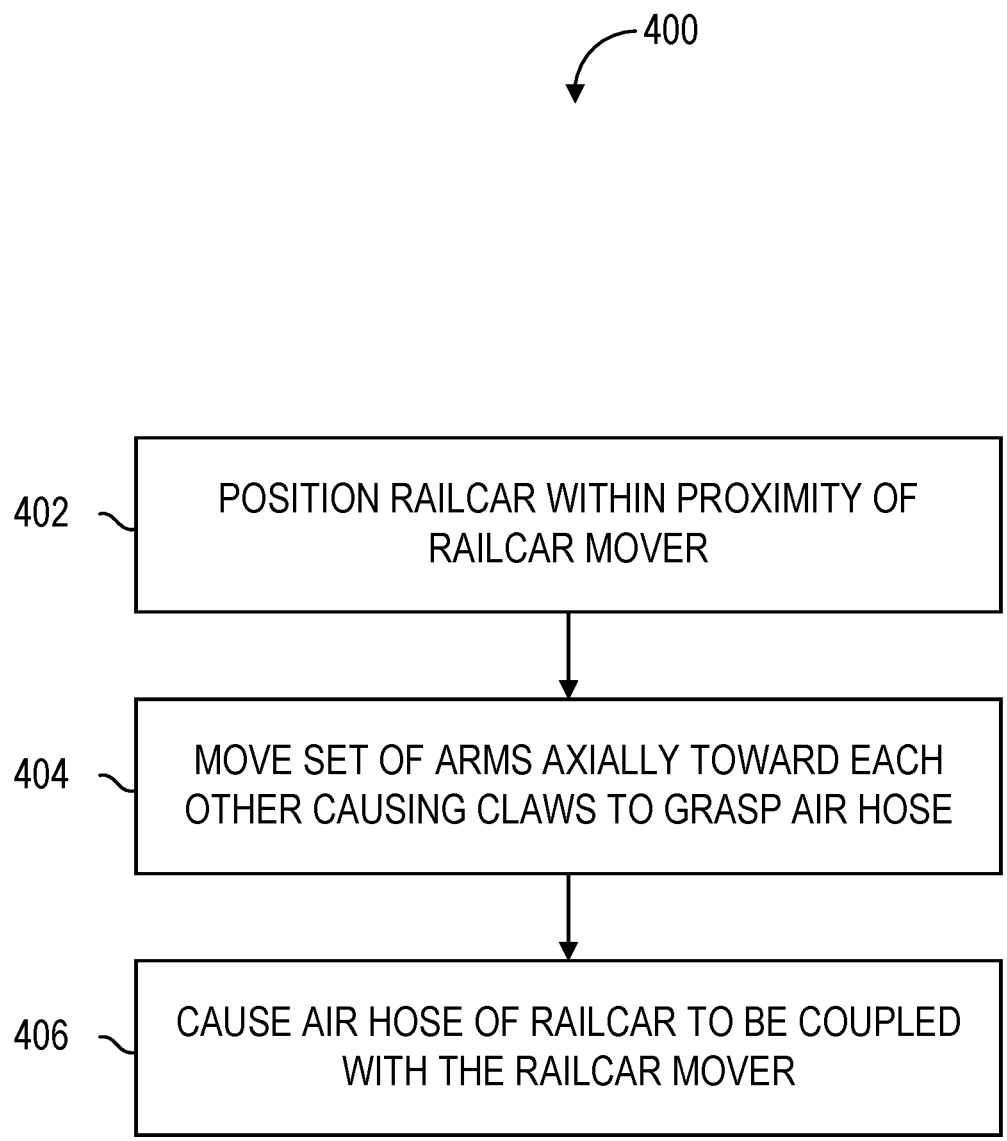
FIG. 4 depicts a flow diagram of an example method for using a claw system to couple and decouple a railcar from a railcar mover or other railway vehicle, according to one or more aspects described herein.

FIG. 4 depicts a flow diagram of an example method 400 for using a claw system to couple and decouple a railcar from a railcar mover or other railway vehicle, according to one or more aspects described herein. In an operation 402, process 400 may include positioning a railcar adjacent to a railcar mover on a set of tracks within a proximity of the railcar mover. In various embodiments, the railcar mover may include a claw assembly comprising a set of arms and a set of claws mounted on the set of arms. In various embodiments, the set of arms may include at least a first arm and a second arm attached to an end of the railcar mover, and the set of claws may include at least a first claw mounted on an interior side of the first arm and a second claw mounted on an interior side of the second arm. In an operation 404, process 400 may include moving the set of arms axially along the end of the railcar mover toward each other in a direction perpendicular to the set of tracks. In various embodiments, this movement may cause the set of claws to close around an air hose of the railcar. In some embodiments, the set of arms may be affixed to a motorized rail or a set of motorized rails positioned horizontally on the bumper of the railcar mover upon which the set of arms may be configured to moved axially. In various embodiments, the claws may include openings configured to grasp the air hose. In some embodiments, the claw system may include one or more Hall effect sensors. In such embodiments, when the set of claws have grasped the air hose of the railcar may be detected based on input from the one or more Hall effect sensors. In response to detecting that the set of claws have grasped the air hose or the railcar, movement of the set of arms toward each other may be automatically stopped. In some embodiments, the set of arms may each include a motorized rail positioned horizontally on the interior side of the arm to which at least one of the set of claws is affixed. In such embodiments, for example, each claw may be configured to move axially along one of the set of arms toward the end of the railcar mover, thereby causing the air hose to be positioned closer to the railcar mover. In some embodiments, the set of arms are moved axially along the end of the railcar mover toward each other automatically based on input from one or more proximity sensors positioned on the end of the railcar mover, the set of arms, and/or the set of claws. In an operation 406, process 400 may include cause the air hose of the railcar to be coupled with the railcar mover. In some embodiments, operation 406 may be performed manually by a crew member or automatically using one or more automatic coupling techniques now known or future developed.

The claw system of the present invention can improve the efficiency with which a railcar mover is able to couple and decouple from a rail car or set of rail cars. Indeed, the system described herein may enable the coupling and decoupling process to be fully automated. The claw system described herein also does not require a worker to present, thereby preventing a worker from having to take time away from other process, be exposed to the outdoor environment, and position their body in an un-ergonomic orientation in a dangerous position (e.g., between a rail car and railcar mover being coupled).

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A claw system for mechanical coupling a railcar mover to a railcar comprising:
   a set of arms attached to an end of a railcar mover, the set of arms including at least a first arm and a second arm; and
   a set of claws mounted on the set of arms, wherein the set of claws include a first claw mounted on an interior side of the first arm and a second claw mounted on an interior side of the second arm, wherein the interior side of the first arm faces toward the interior side of the second arm, and wherein the claws each include openings configured to grasp an air hose of a railcar adjacent to the railcar mover on a set of tracks,
   wherein the arms are configured to move axially along the end of the railcar mover toward each other in a direction perpendicular to the set of tracks, thereby causing the set of claws to close around the air hose of the railcar adjacent to the railcar mover.

2. The claw system of claim 1, wherein the opening of the first claw is offset with respect to the opening of the second claw such that the first claw and the second claw overlap when the arms move toward each other.

3. The claw system of claim 1, wherein the position of the first claw on the first rail is offset with respect to the position of the second claw on the second rail such that the first claw and the second claw overlap when the arms move toward each other.

4. The claw system of claim 1, wherein the arms are attached to the end of the railcar mover via a bumper of the railcar mover.

5. The claw system of claim 4, wherein the arms are affixed to a motorized rail positioned horizontally on the bumper of the railcar mover, and wherein the arms are configured to move axially on the motorized rail.

6. The claw system of claim 4, wherein the arms are affixed to the bumper of the railcar mover via a set of horizontal rails, and wherein the arms are configured to move axially along the end of the railcar mover via the set of horizontal rails.

7. The claw system of claim 1, wherein the arms each include a motorized rail positioned horizontally on the interior side of the arm, and wherein the claws are each configured to move axially along one of the set of arms in a direction parallel to the set of tracks.

8. The claw system of claim 7, wherein the first claw is affixed to a motorized rail positioned horizontally on the interior side of the first arm and the second claw is affixed to a motorized rail positioned horizontally on the interior side of the second arm, and wherein the first claw is configured to move axially along the motorized rail on the interior side of the first arm and the second claw is configured to move axially along the motorized rail on the interior side of the second arm.

9. The claw system of claim 1, wherein the set of arms are configured to move automatically based on input from one or more proximity sensors positioned on the end of the railcar mover, the set of arms, and/or the set of claws.

10. The claw system of claim 1, wherein the set of claws include one or more Hall effect sensors configured to detect when the set of claws have grasped the air hose of the railcar and cause movement of the arms to cease.

11. A method for coupling a railcar mover to a railcar using a claw system, the method comprising:
    positioning a railcar adjacent to a railcar mover on a set of tracks within a predefined proximity of the railcar mover, the railcar mover including a claw assembly comprising a set of arms and a set of claws mounted on the set of arms, wherein the set of arms include at least a first arm and a second arm attached to an end of the railcar mover, and wherein the set of claws include a first claw mounted on an interior side of the first arm and a second claw mounted on an interior side of the second arm;
    moving the set of arms axially along the end of the railcar mover toward each other in a direction perpendicular to the set of tracks, thereby causing the set of claws to close around an air hose of the railcar, wherein the claws each include openings configured to grasp the air hose; and
    cause the air hose of the railcar to be coupled with the railcar mover.

12. The method of claim 11, wherein the set of arms are affixed to a motorized rail positioned horizontally on the bumper of the railcar mover, and wherein the set of arms are moved axially on the motorized rail.

13. The method of claim 11, wherein the set of arms are affixed to a set of motorized rails positioned horizontally on the bumper of the railcar mover, and wherein the set of arms are moved axially on the set of motorized rails.

14. The method of claim 11, wherein the arms each include a motorized rail positioned horizontally on the interior side of the arm to which at least one of the set of claws is affixed, the method further comprising:
    moving each of the set of claws axially along one of the set of arms toward the end of the railcar mover, thereby causing the air hose to be positioned closer to the railcar mover.

15. The method of claim 11, wherein the set of arms are moved axially along the end of the railcar mover toward each other automatically based on input from one or more proximity sensors positioned on the end of the railcar mover, the set of arms, and/or the set of claws.

16. The method of claim 11, further comprising:
    detecting when the set of claws have grasped the air hose of the railcar based on input from one or more Hall effect sensors; and
    causing movement of the set of arms toward each other to cease in response to detecting that the set of claws have grasped the air hose or the railcar.

* * * * *